June 6, 1961  R. B. RUNKLE  2,987,611
RESISTANCE WELDING METHOD AND APPARATUS
Filed Aug. 10, 1959  2 Sheets-Sheet 1
Fig. 5.
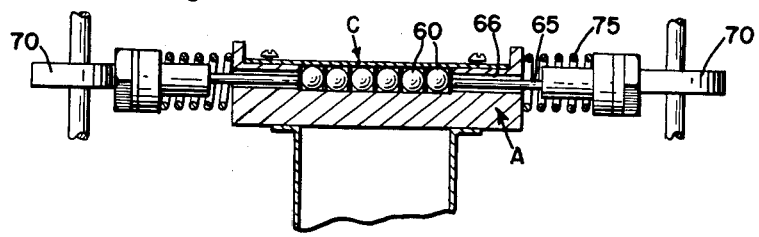
Fig. 6.
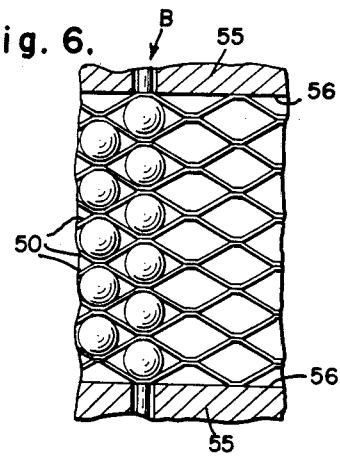
Fig. 1.
Fig. 2.
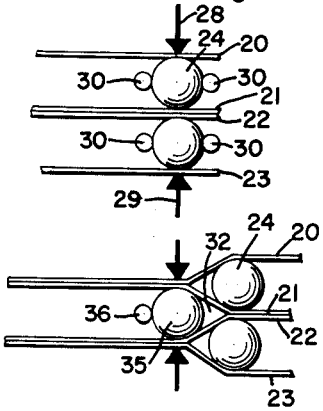
Fig. 7.
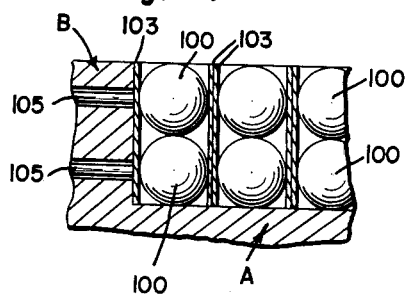
Fig. 8.
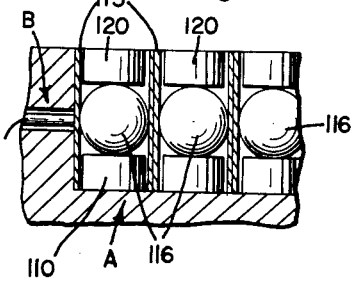
INVENTOR.
Raymond B. Runkle
BY
Townsend and Townsend
attorneys

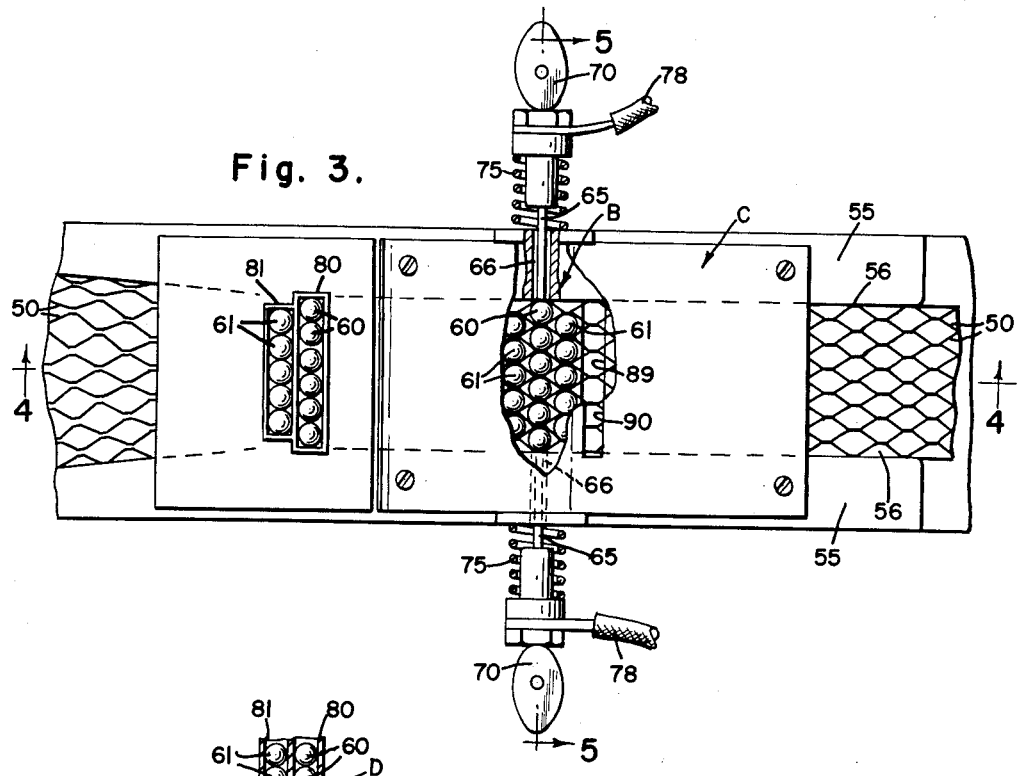
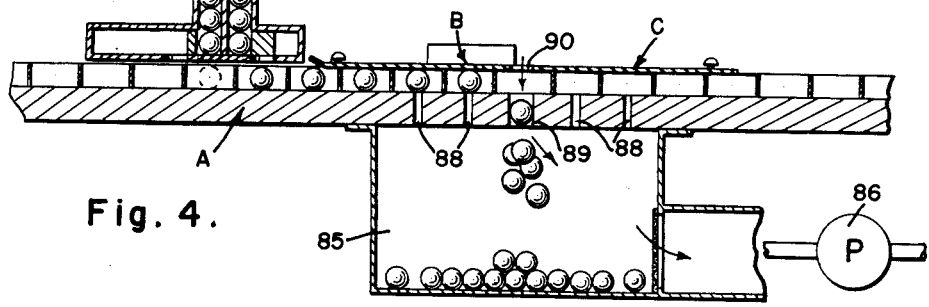

2,987,611
RESISTANCE WELDING METHOD AND APPARATUS

Raymond B. Runkle, Berkeley, Calif., assignor to Hexcel Products Inc., Berkeley, Calif., a corporation of California
Filed Aug. 10, 1959, Ser. No. 832,614
14 Claims. (Cl. 219—117)

This invention relates to a method of and means for resistance welding of strips of metal to form a welded honeycomb structure.

More particularly this invention relates to the art of forming core which generally comprise strips of metal welded at nodes to form a unitary welded honeycomb structure. Such core materials are conventionally sandwiched between sheet material to form a strong, light weight sandwich.

Various commercial means of assembling ribbons to form the cores have been successfully employed including gluing and brazing. In applications where heat is an important factor the methods of gluing or brazing are unsuitable in that the ambient temperature may rise to an area in excess of the melt or break down point of the respective glue or brazing alloy. Thus in applications such as in the cowling or structural members for engines and the skin components for supersonic aircraft or missiles the heat problem requires that the metal alloy forming the honeycomb and the bond joining the strips together be resistant to the operating temperatures. Welded core is suitable for such applications. However, it has been found extremely difficult to provide means commercially acceptable for welding nodes of honeycomb core. For this reason the presently available welded core is extremely expensive.

A principal object of this invention is to provide a method by which metallic ribbons may be assembled in an assembly line or mass production process in a manner to allow one welding circuit path to cause rows of nodes to be simultaneously welded. By this device the cores may be welded in an assembly line process involving great economies in time and labor.

Another object of this invention is to further provide a device for welding of substantially parallel ribbons incorporating a plurality of conductive spacers disposed between alternated ribbons so that each two conductive spacers have a pair of abutting ribbons sandwiched between them and further providing means to compress the conductive spacers together while simultaneously applying electrical energy to effect the weld joining the abutting portions of the two ribbons at the present point created by the two electrodes. This system is expandable to allow a great number of electrodes and ribbons to be provided in a row in which the point of contact of the electrodes with the respective ribbons is arranged in a common line substantially normal or transverse to the mean longitudinal axis of the ribbons.

Another object of this invention is to provide a novel welding device and method for forming honeycomb structure from ribbon of conductive material by placing the ribbons in substantially parallel relationship and placing a conductive spacer between alternate pairs of ribbons in a line substantially normal to the mean longitudinal axis of the ribbons in which the edges of the conductive spacers are in substantially precise alignment relative to each other and in which pressure means are arranged to act against the two outer ribbons in axial alignment with the contacting line formed by the conductive spacers to provide an electrically conductive path through the respective ribbons and conductive spacers from the points of pressure application. When the electrodes at the points of pressure application are energized with electrical energy of suitable potential and current, a weld is effected between abutting ribbons.

A feature and advantage of this invention is that the device may be used equally well with flat ribbons and ribbons which have been previously corrugated. In the case of uncorrugated ribbons the provision of the conductive spacers form the corrugation at the time of welding. In the case of corrugated ribbon the conductive spacers only form a conductive path in the spaces formed by the corrugations and prevent collapse of the cellular areas.

Still another object of this invention is to provide a novel method of welding abutting nodes of metal foil together which includes conductive spacers formed in a spherical configuration and arranged in alignment so that two conductive spacers on opposite sides of nodes are in tangental alignment with each other to provide a conductive path directly through the node to the other electrode.

A further object of this invention is to provide a novel method for positioning the conductive spacers in alignment relative to the cell walls of the cellular material to be welded so that the conductive spacers are in precise alignment to form a conductive path through the entire bank of cells.

Still a further object of this invention is to provide an apparatus for sequentially moving parallel ribbons past a fixed welding station in which conductive spacers are positioned between alternate ribbons prior to the ribbons being advanced to the welding station so that the conductive spacers are at the welding station to provide a conductive path from node to node in a direction substantially transverse the longitudinal axis of the ribbons through which welding current may be passed.

Another feature and advantage of this invention is the provision of novel means for inserting the conductive spacers in the appropriate space between alternate ribbons in each row and to withdraw the conductive spacers by means of pneumatic pressure so that the conductive spacers are removed from the cellular areas after being advanced beyond the welding station.

Still another object of this invention is to provide a novel means for aligning the respective parallel ribbons in precise alignment relative to each other by means of pneumatic pressure by the provision of a horizontal guide plate upon which the ribbons are advanced on edge in parallel relationship and in which a top plate is provided defining an air sealed chamber resiliently movable so that by air pressure means the top plate may be biased downwardly against the top edge of the ribbons to force the ribbons to align against the base or bottom plate.

Still another object of this invention is to provide a combination of electrode means wherein spacer elements and conductive spherical spacers are arranged in combination so as to provide a common electrical path through the core configuration to be welded by positioning the spherical spacers with their center points in alignment and the ribbons abutting the spherical spacers in aligned tangental relationship.

Another object of this invention is to provide a spacing apparatus employing removable members which function to hold ribbon in place so that the ribbons may be bonded together.

A further feature and advantage of this invention is that the device, while particularly suitable for resistance welding, is also useful in other bonding operations such as gluing with an adhesive fusion welding and brazing.

In addition the device is useful to hold the welding nodes in position so that electrodes can be inserted on opposite sides of the nodes to effect welds.

Other objects of the present invention will become apparent upon reading the following specification and referring to the accompanying drawings in which similar characters of reference represent corresponding parts in each of the several views.

In the drawings:

FIG. 1 is a schematic view illustrating a configuration for welding two abutting uncorrugated ribbons to form a single welded node.

FIG. 2 is a view similar to FIG. 1 showing the configuration in a different stage of operation.

FIG. 3 is a top plan view of a welding machine for sequentially welding rows of nodes of corrugated ribbon with a portion cut away to show the inner structure.

FIG. 4 is a fragmentary side elevational view of FIG. 3 taken at line 4—4.

FIG. 5 is a fragmentary cross-sectional view of FIG. 3 taken at line 5—5.

FIG. 6 is an enlarged top plan of the welding station.

FIG. 7 is a view showing a modification of the conductive spacers incorporating a pair of spherical members to effectuate a pair of welds at each node.

FIG. 8 is another modification of the conductive spacers of the invention including spacer means to position the conductive spacers in a fixed position relative to the nodes.

Referring now to the drawings and with particular reference to FIGS. 1 and 2 the basic concept of this invention is illustrated by four conductive ribbons 20, 21, 22 and 23. The ribbons are placed in substantially parallel relationship with conductive brass or bronze spherical spacers 24 and 25 placed between alternate ribbons, that is between ribbons 20 and 21 and between ribbons 22 and 23 respectively. Outer ribbons 20 and 23 are then forced together by electrode members schematically illustrated by arrows 28 and 29 respectively.

Conductive spherical spacers 24 and 25 are aligned with their centers in axial alignment in a line transverse to the longitudinal axis of ribbons 20 through 23.

The application of force by electrodes 28 and 29 is applied in axial alignment with the center point alignment of the two spacers 24 and 25 to compress all the conductive ribbons 21 through 23 and spacers 24 and 25 together to form a row of axially aligned pressure points. In this relationship tangental point of contact between spacer 24 and ribbons 20 and 21 and tangental point of contact between spacer 25 and ribbons 22 and 23 are in axial alignment. The point of pressure between ribbons 21 and 22 is also in alignment with the tangental contacting points of spacers 24 and 25. Spacers 24 and 25 are held in longitudinal alignment by removable guides 30.

A common low resistance path is thus created by virtue of the pressure created by the two electrodes 28 and 29. Welding current is then connected to electrodes 28 and 29 to cause welding current to flow through the electrodes and ribbons. The current passing through ribbons 21 and 22 will therefore weld the two ribbons together at nodes 32.

In the next step of operation, as shown in FIG. 2, a single spherical spacer member 35 is placed between the other alternate ribbons 21 and 22 and is held in longitudinal alignment relative to the ribbons by a removable guide 36 and welded node 32.

Ribbons 20 and 21, and ribbons 22 and 23 are forced together against the respective opposite sides of spherical spacer member 35 by electrodes 28 and 29 in the same manner as described above so as to provide an axial aligned pressure line between the electrodes through the ribbons. Here again welding current is applied at the electrodes to create welds between ribbons 20 and 21 and between ribbons 22 and 23. The process is thence again repeated by placing electrodes between ribbons 20 and 21 and 22 and 23 in the manner as shown in FIG. 1. Thus by continuous repetition of this process a honeycomb configuration can be welded.

The above process is extended to weld more than four previously corrugated ribbons in the preferred embodiment of the invention as shown in FIG. 3. This device provides means adaptable to create simultaneous welds between twelve ribbons. A guide platform A is provided to guide the travel of previously corrugated ribbons generally indicated at 50 past a welding station generally indicated at B for welding. The transverse alignment of ribbons 50 is effected by guides 55 which are formed by spaced parallel walls 56 between which the ribbons travel in edge alignment.

A top plate indicated at C is resiliently mounted on guides 55 over corrugated ribbons 50 so as to enable the top plate to be vertically movable down against the top edge of corrugated ribbons 50 to bias the ribbons against bottom platform A.

A feeding station D is arranged to feed brass or bronze spheres 60 between alternate pairs of ribbons 50 and to feed sphere 61 between the other alternate pairs of ribbons 50. Welding station B includes a pair of oppositely facing shaft electrodes 65 which are arranged to pass through apertures 66 in guide 55 to mate with the edge of ribbons 50 in axial alignment with each other and a row of the spherical members 60 and 61.

A cam actuating device including a cam 70 and a spring return 75 are arranged to sequentially retract shafts 65 from engagement with outer ribbons 50 and to force shafts 65 against the ribbons.

Electrical connectors 78 are connected to respective shafts 65 to supply electrical current to the shafts.

A timing device, not shown, is arranged to supply electrical current to connectors 78 at the time that shafts 65 are in the full in position, i.e., in full forceful mating contact with outer ribbons 50.

The input end of edge 56 of guides 55 cambers outwardly at the input side of spacer feeding station D to allow sufficient spacing to be available between the ribbons at the station to allow spacers 60 and 61 to be inserted between the ribbons. The spacer inserting station comprises generally a pair of parallel columns including vertical and horizontal rows of spacers 60 and 61. The rows 61 are staggered relative to spacers 60 so that the row 80 carrying spacers 60 is aligned to allow spacers to drop in a first group of cells and the row 81 carrying spacers 60 are aligned with the spacers to drop in the next adjacent row of cells. The spacers are gravity fed for insertion in the cellular areas between ribbons 50 and are free to fall into the cellular areas by virtue of the enlarged spacing between ribbons at feeding station D. Guides 55 thence narrow to parallel relationship at welding station B to bias or substantially compress the nodes of ribbons 50 to contacting relationship. Spacers 60 and 61 are all of equal diameter and are arranged of sufficient size so that the diameter of the spherical members plus the thickness of ribbons 50 will form a line length which is equal to or just slightly less than the spacing between guides 55 at the welding station.

The height of ribbons 50 and the diameter of spacers 60 and 61 are substantially equal so that when top plate C is biased downwardly there is a biasing force which is arranged to force the spacers and ribbons 50 downwardly and against guide platform A. Longitudinal registration of the spacers relative to one another and in a common line which is normal to the mean longitudinal axis of ribbons 50 is effected by the corrugations themselves in combination with the effect of side walls 56 of guides 55. Thus the spacers are held in captive within the cellular areas and in substantially precise longitudinal alignment. By this means the spacers are both in longitudinal, transverse and elevational alignment so that the welded points through the nodes are in axial alignment.

Shafts 65 are positioned in the same axial alignment as the center points of the spheres. When shafts 65 are moved inwardly there is a force generated to form a compressed line between the tangentially connecting joints of the spacers which in turn forms pressure points between each of the alternating ribbons. Thereafter upon application of welding current on connectors 78 current will pass through the respective spherical members to effect welding of the ribbons together at the point of tangental contact of the spacers with the ribbons.

The ribbons are advanced through the device by some suitable means so that the ribbons will alternately advance sequentially to stop the ribbon with the center point of the respective nodes of each of the nodes to be welded aligned with the electrodes. This may be done manually by aligning the ribbons or by any of such commonly used devices as a modified Geneva mechanism where there is a start-stop advance of equal distance.

Air pressure is employed to pull pressure plate C down in biasing contact with the ribbons and the spacers. An air chamber 85 is mounted on and under guide platform A for this purpose. The pressure chamber is arranged in contact with a vacuum pump 86 which withdraws air from chamber 85 and creates a partial vacuum within the chamber. Air ports 88 are arranged in guide platform A in communication to lower the air pressure in cellular areas immediately under plate C so that air is withdrawn from the respective cellular areas. Pressure plate C and its resilient support forms a substantial air seal around the plate so that the partial vacuum created in the cellular area allows atmospheric pressure to bias the plate downwardly. The spacers are removed from the cellular areas after passing the welding station by providing an elongated slot 89 in platform which communicates with air chamber 85. The slot is arranged in substantially wider dimension than the diameter of spacers 60 or 61. The top of pressure plate C is provided with a similar air slot to provide an air flow from atmosphere through slot 89. By this means the combination of atmospheric pressure coming through slot 90 acts on the spacers to force them down through slot 89 wherein they will fall into air chamber 85. Thus the completed core coming out of the device has the spacers removed.

Normally during the welding operation, if the spacers become pitted they can be considered expendable, and new spacers can be used for each welding operation.

Referring to the embodiment of FIG. 7 there is provided a pair of spherical conductive spacers 100 which are mounted on top of each other in each of the cellular areas formed between strips 103. By this means a pair of stacked shafts 105 can make contact simultaneously or alternately to form two sets of parallel welds.

In the embodiment of FIG. 8 there is provided means for spacing the spherical conductive spacers in cellular areas at an elevation substantially higher than the diameter of the spacers. The devices include cylindrical spacer members 110 which are placed within the cellular areas between strips 115 in such a way as to align the spherical spacers 116 in precise horizontal alignment above the surface of guide platform A. By this means the position of the weld relative to the elevational alignment of the cell can be controlled.

A similar spacer 120 is provided over spherical member 116 so that biasing plate C can act against spacer member 120 so as to force the entire group including spacer member 120, spherical spacer 116 and spacer 110 against guide platform A to effect alignment of the conductive spacer member.

The device has been principally described as employed for resistance welding through the current path between the electrode shafts 65. However, it is also to be observed that the device is suitable for holding the unwelded nodes in place so that they may be welded by inserting a welding device on opposite sides of the ribbons. Thus, for example, with reference to FIG. 3, the electrode assembly can be rendered inoperative and the unwelded core can be positioned within the device as shown in FIGS. 3 and 4. It will be noted that the conductive spacers 60 and 61 are removed through slot 89 thus leaving the area imediately over the slots in which the cells are supported with their nodes in abutting condition but with the spacers removed. Electrical tweezer members can be inserted in the cell area at this point on opposite sides of the ribbons at the nodes to effect welds. This performs an alternate means of welding the ribbons together and has the advantage that the welds on the discharge end of the device function to hold the honeycomb together while the spacer members on the forward end of the device serve to similarly hold the ribbons in proper spaced relation.

The device similarly may be used for other forms of bonding. By ignoring the electrical portion of the electrode mechanism, wherein the rods 65 may be used just as pressure members to force the ribbons and spacer members together if the entire unit is heated, and a brazing alloy applied, a fusion weld can be effected.

It is further to be observed that pressure reactant glue can be placed between the various nodes so that the removable balls or spheres can function to create the pressure at the joints to effect bonding of the ribbons.

Although the foregoing invention has been described in some detail by way of illustration and example for purposes of clarity of understanding, it is understood that certain changes and modifications may be practiced within the spirit of the invention as limited only by the scope of the appended claims.

What is claimed:

1. A method of resistance welding metallic ribbons to form honeycomb having the steps of: aligning a plurality of ribbons in side by side relationship; inserting a plurality of electrically conductive spacer members between alternate pairs of said ribbons; aligning said spacer members in a row; compressing the outermost ribbons together against said spacer members; and connecting an electrical current to said two outermost ribbons to pass an electrical current through the ribbons and said spacer members.

2. A method of resistance welding metallic ribbons to form honeycomb comprising the steps of: aligning the metallic ribbons in side by side relationship; positioning electrically conductive spacer members between alternate pairs of said ribbons; aligning said spacer members to form an axially aligned row of point contacts with the respective ribbons; compressing the outermost of said ribbons together against said spacer members; and connectiing an electrical current to the outermost ribbons at a point in axial alignment with the point contacts between said spacer members and said ribbons.

3. A method of resistance welding metallic ribbons to form honeycomb comprising the steps of: aligning a plurality of metallic ribbons in side by side relationship; inserting a plurality of electrically conductive spacer members between first alternate pairs of ribbons; aligning said spacer members in a row aligned substantially transverse the longitudinal axis of said ribbons; passing an electrical current through said ribbons and said spacer members; inserting a plurality of electrically conductive spacer members between second alternate pairs of said ribbons; aligning the spacer members in a row substantially transverse the longitudinal axis of aid ribbons; and passing an electrical current through aid ribbons and electrical conductive members.

4. In a welding device for resistance welding metallic ribbon to form honeycomb the combination of: means to hold a plurality of metallic ribbons in side by side relationship; a plurality of electrically conductive spacer members positioned between alternate pairs of ribbons; means to compress the outermost ribbons together against said spacer members; and means to connect an electrical current to the two outermost ribbons to pass current through said ribbons and spacer members.

5. A device according to claim 4 and wherein said spacer members are formed in a spherical configuration.

6. A device for resistance welding metallic ribbons to form honeycomb comprising: a welding station; a pair of axially aligned spaced apart electrode means for said welding station; means to guide a plurality of metallic ribbons to pass through said welding station in side by side relationship; a plurality of electrically conductive spacer members positioned between alternate pairs of ribbons; means aligning said spacer members in a row axially aligned with said electrode means; means to compress said electrode means against the outermost of said ribbons; and means to connect electrical current to said electrode means.

7. A device according to claim 6 and wherein said spacer members are formed in a spherical configuration having a diameter substantially equal to the height of said ribbons.

8. A device according to claim 6 and wherein said spacer members are formed in a spherical configuration; and means supporting said spacer members to align said spacer members at a predetermined position between the upper and lower edge of said ribbons.

9. A device according to claim 6 and wherein said spacer members are formed in a spherical configuration; means supporting said spacer members to align said spacer members midway between the upper and lower edges of said ribbons; and means mounted on top of said spacer members having an uppermost extension at the same elevation as the top of said ribbons.

10. A device according to claim 6 and wherein each one of the pairs of said electrode means include a pair of rod members mounted one over the other; and said spacer members include a pair of stacked spherical members.

11. A device for resistance welding metallic ribbon to form honeycomb comprising: a welding station; means to guide a plurality of metallic ribbons to pass said welding station in side by side relationship; a plurality of spherical electrical conductive spacer members mounted between alternate pairs of ribbons; said welding station including a pair of axially aligned electrodes; each of said electrodes being mounted on opposite sides of the ribbons at said welding station; means to compress said electrodes against the outermost of said ribbons; means to align said spacer members with the tangental point of contact between said spacer members and said ribbons being in a row axially aligned with said electrode; and means to connect an electrical current to said electrodes to pass electrical current through said ribbons and spacer members.

12. A device for resistance welding metallic ribbon to form honeycomb comprising: a platform; means to guide a plurality of metallic ribbons in side by side relationship on said platform; a welding station mounted on said platform having an electrode mounted on each of the two opposite sides of the ribbons passing through said welding station; said welding electrodes being positioned in axial alignment relative to one another on an axis transverse the longitudinal axis of said ribbons; electrically conductive spherical spacer members positionable between alternate pairs of ribbons; means to feed a first row of said spacer members in the space between first alternate pairs of ribbons and means to feed a second row of said spacer members between second alternate pairs of ribbons; means comprising said metallic ribbons to align said rows of spacer members transverse to the longitudinal axis of said ribbons and in axial alignment with said electrodes; means to compress said electrodes against said ribbons; and means to apply electrical current to said electrodes.

13. A device for resistance welding metallic ribbon to form honeycomb comprising: a platform; means to guide a plurality of metallic ribbons in side by side relationship on said platform; a welding station mounted on said platform having an electrode mounted on each of the two opposite sides of the ribbons passing through said welding station; said welding electrodes being positioned in axial alignment relative to one another on an axis transverse the longitudinal axis of said ribbons; electrically conductive spherical spacer members positionable between alternate pairs of ribbons; means to feed a first row of said spacer members in the space between first alternate pairs of ribbons and means to feed a second row of said spacer members between second alternate pairs of ribbons; means comprising said metallic ribbons to align said rows of spacer members transverse to the longitudinal axis of said ribbons and in axial alignment with said electrodes; means to compress said electrodes against said ribbons; means to apply electrical current to said electrodes; a pressure plate mounted over said welding station; means to withdraw air from between the ribbons at said welding station to force said pressure plate against said ribbons to force the ribbons downwardly against said platform; an aperture in said platform formed of sufficient dimension to allow said spacer members to pass through said platform; and vacuum means under said aperture to forcefully withdraw the spacer members from between said ribbons.

14. A device for resistance welding metallic ribbon to form honeycomb comprising: a horizontal plate; a pair of spaced apart vertical guides mounted on said plate; a vertical movable plate over said guide; a plurality of metallic ribbons mounted on edge in side by side relationship on said horizontal plate; conductive spacer members; means to insert said spacer members between first alternate pairs of ribbons and between second alternate pairs of ribbons; axially aligned electrode means mounted in each said guide means; means to force said electrode means against the outermost ribbons in alignment with the row of said spacer members; means to apply electrical current to said electrode means; means to withdraw air from the area between said horizontal plate and said vertical movable plate to force said vertical movable plate downwardly against the upper edge of said ribbons; said horizontal plate formed with an aperture sufficiently large to allow said spacer members to pass therethrough; and vacuum means to withdraw air downwardly through said aperture to forcefully remove said spacer members from said ribbons.

References Cited in the file of this patent

UNITED STATES PATENTS

| 2,445,801 | Partiot | July 27, 1948 |
| 2,780,716 | Wasilisin | Feb. 5, 1957 |